United States Patent Office 3,564,014
Patented Feb. 16, 1971

3,564,014
DITHIOLE COMPOUNDS AND PREPARATION
Erwin Klingsberg, Geneva, Switzerland, assignor to American Cyanamid Company, Stamford, Conn., a corporation of Maine
No Drawing. Filed Mar. 12, 1968, Ser. No. 712,383
Int. Cl. C09b 23/00; C07d 71/00; C09d 49/00
U.S. Cl. 260—327                  11 Claims

ABSTRACT OF THE DISCLOSURE 3-chloro-1,2-dithiolium salts such as 3-chloro-1,2-benzodithiolium chloride condense with aliphatic, cycloaliphatic or aromatic ketones having a free alpha position to give 3-(2-oxoethylidene)-3H-1,2-dithiole compounds of the formula

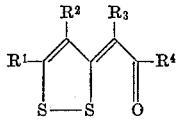

where $R^1$ and $R^2$ typically form a benzo or naphtho ring, $R^3$ is alkyl or benzoyl; $R^4$ is alkyl or phenyl; and where $R^3$ and $R^4$ typically also may together form a cyclopentyl or cyclohexyl ring. The products are dyestuffs and intermediates for the preparation of thiothiophthenes, another class of dyes.

---

This invention relates to heterocyclic carbon compounds in which the hetero atom is sulfur and processes for their preparation.

More particularly, the compounds of the invention are 3-(2-oxoethylidene)-3H-1,2-dithiole compounds of the formula

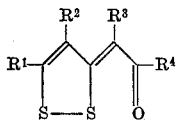                (I)

where $R^1$ and $R^2$ together with the dithiole ring form a monocyclic or fused bicyclic aromatic group; $R^3$ is alkyl or benzoyl; $R^4$ is alkyl or phenyl; and where $R^3$ and $R^4$ together with the carbon atoms to which they are bonded may form a monocyclic or fused bicyclic hydrocarbon group, the ring containing the keto group being saturated; provided that when $R^4$ is phenyl, $R^1$ and $R^2$ together form said aromatic group.

In the above description the preferred alkyl groups are lower alkyl (1 through 8 carbon atoms) and the preferred ring structures defined by $R^1$ taken with $R^2$ or by $R^3$ taken with $R^4$ contain a total of not more than 12 ring carbon atoms. These ring structures, however, may be substituted with one or more alkyl groups preferably lower alkyl, as will be apparent from the description of the reactants from which they are derived. The terms "aromatic group" and "hydrocarbon group" are intended to include such alkyl-substituted ring structures.

It will be seen from Formula I above that the above compounds differ from earlier work of the same inventor, as described in U.S. Patent 3,211,749 and J. Am. Chem. Soc. 85, 3244 (1963), by introduction of an aromatic group (benzo, naphtho) into the dithiole portion of the molecule.

The compounds of the general Formula I are prepared by the condensation of a 3-chloro-1,2-dithiolium salt with a ketone having a free alpha position as follows:

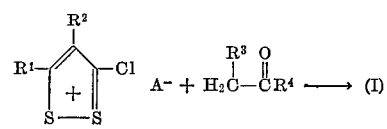

where $A^-$ is an anion such as chloride or sulfate and the R groups are as defined above.

Typical 3-chloro-1,2-dithiolium salts are 3-chloro-1,2-dithiolium chloride, 3-chloro-5-phenyl-1,2-dithiolium chloride, 3-chloro-4,5-diphenyl-1,2 - dithiolium chloride, 3-chloro-1,2-benzodithiolium chloride (prepared by reacting 3H-1,2-benzodithiole-3-thione and sulfur dichloride), and 3-chloro-5-methylnaphtho[1,2-c]-1,2-dithiolium chloride, the salt obtained by the reaction of 5-methyl-3H-naphtho[1,2-c]-1,2-dithiole-3-thione and sulfur dichloride. The preparation of some of the salts is described further hereinafter, by Faust and Mayer, Ann. 688, 150 (1965) or in U.S. Pat. 3,211,749.

The invention also includes certain of the 3-chloro-1,2-dithiolium salt intermediates, namely, those of the formula:

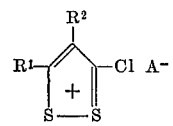

where $R^1$ and $R^2$ together with the dithiole nucleus form a monocyclic or fused bicyclic aromatic group; and $A^-$ is an inorganic anion such as halide (chloride, bromide, iodide), sulfate or perchlorate. The intermediates are prepared by reaction of sulfur dichloride with known thiones, typically by refluxing the reactants in an inert solvent medium as illustrated in Example 1 below.

The ketones usable in this invention include aliphatic, cycloaliphatic, and aromatic ketones having a free alpha position, thus providing a site at which condensation can occur. Representative ketones are cyclopentanone, cyclohexanone, diethyl ketone, 4-methyl-1-tetralone, dibenzoylmethane, 4-methylcyclohexanone and 4-tert-butylcyclohexanone. Depending upon the degree of activation, the reaction may be run at room temperature or with heating, preferably to reflux temperature, e.g., up to 170° C. The reaction is conveniently run in an inert solvent, such as acetonitrile, toluene, chlorobenzene, or the like. Alternatively, the reaction may be conducted in the absence of solvent, typically by fusion at about 90–110° C. Reactant proportions and other conditions, including separation and purification techniques, are variable as desired.

The products of Formula I are useful as dyes for fibers and fabrics such as cellulose acetate, and are convertible to thiothiophthene, another class of dyes, by reaction with $P_2S_5$ in the manner described in U.S. Pat. 3,211,749.

The following examples are intended as further illustration of, but not as limitation on, the invention except as set forth in the claims. Temperatures are in degrees centigrade.

EXAMPLE 1

3-chloro-1,2-benzodithiolium chloride

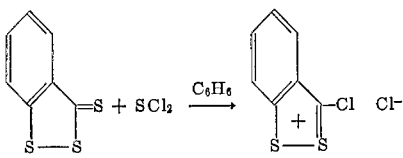

A solution of 6 grams 3H-1,2-benzodithiole-3-thione in 60 milliliters refluxing benzene was stirred vigorously during the addition of 6.0 milliliters sulfur dichloride. Stirring and refluxing were continued for one-half hour, followed by cooling and filtration. The product 3-chloro-1,2-benzodithiolium chloride was washed with a little carbon disulfide and quickly dried to yield 7.0 grams of yellow solid.

EXAMPLE 2

3-(5-oxocyclopentylidene)-3H-1,2-benzodithiole

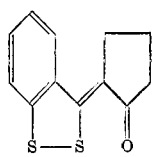

3-chloro-1,2-benzodithiolium chloride, prepared from 10 grams of 3H-1,2-benzodithiole-3-thione as described in Example 1, was stirred and warmed in 40 milliliters cyclopentanone, finaly being refluxed for 10 minutes. The brown product was obtained by evaporation and crystallized from methylcyclohexane or acetic acid, melting point, 152° C.

The product was not obtained at room temperature.

EXAMPLE 3

3-(6-oxocyclohexylidene)-3H-1,2-benzodithiole

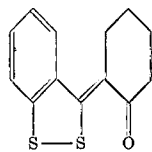

3-chloro-1,2-benzodithiolium chloride, prepared from 6 grams of 3H-1,2-benzodithiole-3-thione as described in Example 1, was fused at 95–100° for one-half hour with 3 milliliters cyclohexanone. The resulting melt was dissolved in benzene and chromatographed on alumina. Benzene elution gave the orange-brown product, which was crystallized from petroleum ether, melting point, 115° C.

The product was not obtained at room temperature.

EXAMPLE 4

3-(2-oxo-1-methylbutylidene)-3H-1,2-benzodithiole

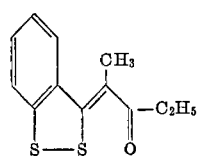

3-chloro-1,2-benzodithiolium chloride, prepared from 10 grams 3H-1,2-benzodithiole-3-thione as described in Example 1, was stirred and refluxed for fifteen minutes in 60 milliliters diethyl ketone. The tan product was obtained by evaporation and crystallized from petroleum ether, melting point, 73° C.

EXAMPLE 5

3-(4-methyl-1-oxo-1,2,3,4-tetrahydro-2-naphthylidene)-3H-1,2-benzodithiole

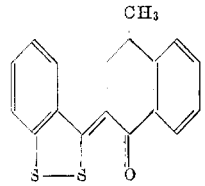

3-chloro-1,2-benzodithiolium chloride, prepared from 6 grams 3H-1,2-benzodithiole-3-thione as described in Example 1, was warmed on the steam bath for fifteen minutes with 5 milliliters 4-methyl-1-tetralone. The product was dissolved in benzene and chromatographed on an alumina column. Elution with benzene gave the brown product, which was crystallized from hexane, melting point, 120° C.

EXAMPLE 6

3-(dibenzoylmethylene)-3H-1,2-benzodithiole

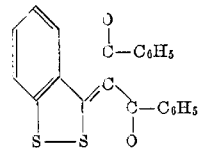

3-chloro-1,2-benzodithiolium chloride (12 grams) and 11.2 grams dibenzoylmethane were stirred for three days in 200 milliliters acetonitrile at room temperature. The product was filtered and crystallized from nitromethane, melting point 188° C.

EXAMPLE 7

3-(3-methyl-6-oxocyclohexylidene)-3H-1,2-benzodithiole

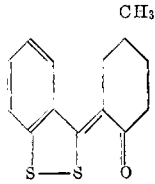

3-chloro-1,2-benzodithiolium chloride (20 grams) was stirred and refluxed for fifty minutes with 15.0 milliliters 4-methylcyclohexanone and 75 milliliters toluene. The product gave brown crystals from acetic acid or methylcyclohexane, melting point, 126° decomposition. It reacted readily with phosphorus pentasulfide in refluxing toluene to give the corresponding thiothiophthene, purple crystals from alcohol or methylcyclohexane, melting point, 150° C.

EXAMPLE 8

3-(3-tert.-butyl-6-oxocyclohexylidene)-3H-1,2-benzodithiole

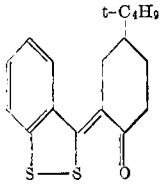

A mixture of 7.2 grams 3-chloro-1,2-benzodithiolium chloride and 6.0 grams 4-tert.-butylcyclohexanone in 50 milliliters toluene was stirred at reflux for one hour, cooled, diluted with hexane, and filtered. The yellowish-red product was crystallized from ethanol, melting point, 166° C.

EXAMPLE 9

3-(2-oxo-1-methylbutylidene)-5-phenyl-1,2-dithiole

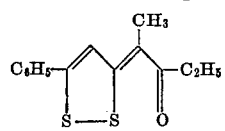

EXAMPLE 10

3-(1,2,3-4-tetrahydro-4-methyl-1-oxo-2-naphthylidene)-5-methyl-3H-naphtho[1,2-c]-1,2-dithiole

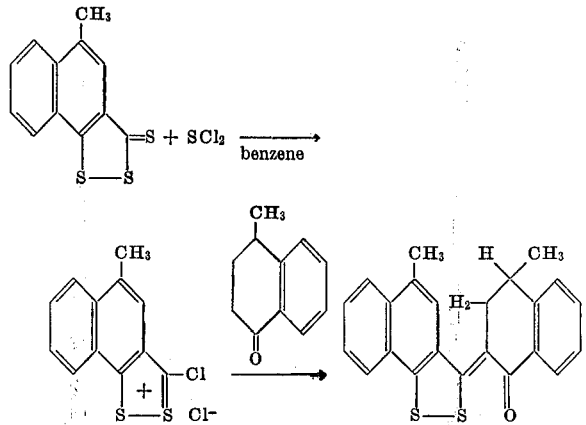

The 3-chloro-5-methylnaphtho[1,2-c]-1,2-dithiolium chloride shown above was prepared from 3.0 grams 5-methyl-3H-naphtho[1,2-c]-1,2-dithiole-3-thione and 3.0 milliliters sulfur dichloride as described in Example 1. It was stirred and refluxed in toluene with 1.7 grams 4-methyl-1-tetralone for two hours. The resulting red oil, obtained on evaporation of the toluene, was chromatographed on alumina. Elution with a methylcyclohexane-benzene mixture gave a red-orange solid, which crystallized from toluene, melting point, 174° C.

I claim:
1. A compound of the formula:

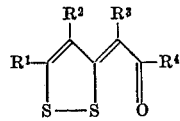

wherein $R^1$ and $R^2$ together with the dithiole ring form an unsubstituted or lower alkyl substituted benzo or naphtho group; $R^3$ is alkyl of 1 to 8 carbon atoms or benzoyl; $R^4$ is alkyl of 1 to 8 carbon atoms or phenyl, or where $R^3$ and $R^4$ together with the carbon atoms to which they are bonded and the oxo group may form an unsubstituted or lower alkyl substituted 2-oxocyclopentylidene, 2-oxocyclohexylidene or 1,2,3,4-tetrahydro-1-oxo-2-naphthylidene group; provided that when $R^4$ is phenyl, $R^1$ and $R^2$ together with the dithiole ring form a benzo group.

2. A compound of claim 1 which is 3-(5-oxocyclopentylidene)-3H-1,2-benzodithiole.

3. A compound of claim 1 which is 3-(6-oxocyclohexylidene)-3H-1,2-benzodithiole.

4. A compound of claim 1 which is 3-(2-oxo-1-methylbutylidene)-3H-1,2-benzodithiole.

5. A compound of claim 1 which is 3-(4-methyl-1-oxo-1,2,3,4-tetrahydro - 2 - naphthylidene)-3H-1,2-benzodithiole.

6. A compound of claim 1 which is 3-(1,2,3-tetrahydro-4-methyl-1-oxo-2 - naphthylidene)-5-methyl-3H-naphtho[1,2-c]-1,2-dithiole.

7. A process for preparing a compound of claim 1 which comprises reacting a compound of the formula:

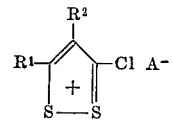

with a ketone of the formula:

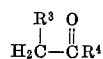

where the R groups are as defined in claim 1 and A⁻ is an anion.

8. The process of claim 7 wherein the dithiolium salt is 3-chloro-1,2-benzodithiolium chloride.

9. The process of claim 7 wherein the dithiolium salt is 3-chloro-5-methylnaphtho[1,2-c]-1,2-dithiolium chloride.

10. A compound of the formula:

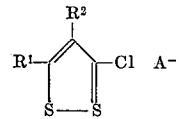

wherein $R^1$ and $R^2$ together with the dithiole ring form an unsubstituted or lower alkyl substituted naphtho group; and A⁻ is an inorganic anion.

11. The compound of claim 10 which is 3-chloro-5-methylnaphtho[1,2-c]-1,2-dithiolium chloride.

OTHER REFERENCES

Faust et al.: Chem. Abs. 64:3512-3 (January 31, 1966).

HENRY R. JILES, Primary Examiner

C. M. SHURKO, Assistant Examiner

U.S Cl. X.R.

260—240; 8—37